United States Patent [19]

Lindholm et al.

[11] 4,387,142

[45] Jun. 7, 1983

[54] GRANULAR MATERIAL CONSISTING OF MICROPOROUS HOLLOW GRANULES OF LEAD POWDER

[76] Inventors: Alfons S. M. Lindholm, Herserudsvagen 2C, S-181 34 Lidingo; Rolf C. G. Magnusson, Matrosvagen 5, S-133 00 Saltsjobaden, both of Sweden

[21] Appl. No.: 204,404

[22] PCT Filed: Jan. 30, 1980

[86] PCT No.: PCT/SE80/00028

§ 371 Date: Sep. 30, 1980

§ 102(e) Date: Sep. 26, 1980

[87] PCT Pub. No.: WO80/01625

PCT Pub. Date: Aug. 7, 1980

[30] Foreign Application Priority Data

Jan. 30, 1979 [SE] Sweden ............................. 7900812

[51] Int. Cl.$^3$ ............................................. H01M 4/14
[52] U.S. Cl. ..................... 429/50; 429/217; 429/225; 429/228; 75/252
[58] Field of Search ............ 429/48, 50, 228, 225, 429/217; 423/559, 619, 620; 252/182.1; 75/0.5 A, 252

[56] References Cited

U.S. PATENT DOCUMENTS 2,132,423 10/1938 Klinker ............................ 423/619
2,728,808 12/1955 Koerner et al. ..................... 429/228
3,259,522 7/1966 Voss et al. ...................... 423/619 X
3,449,166 6/1969 Jache .................................... 423/559
3,623,838 11/1971 Kunz et al. .......................... 429/619
3,702,265 11/1972 Snyder et al. .................. 429/228 X
3,963,517 6/1976 Eckerbom et al. .............. 252/182.1
4,188,268 2/1980 Sugahara et al. ................ 429/228 X
4,252,872 2/1981 Nilsson ............................ 429/228 X

FOREIGN PATENT DOCUMENTS 1013273 8/1957 Fed. Rep. of Germany.
1209103 1/1966 Fed. Rep. of Germany.
1223435 8/1966 Fed. Rep. of Germany.

*Primary Examiner*—Anthony Skapars
*Attorney, Agent, or Firm*—Townsend and Townsend

[57] ABSTRACT

The present invention relates to a granular material consisting of microporous, substantially hollow granules of lead powder, which is a powdered mixture of lead and lead oxide; a method for the production of this granular material; and the use thereof as an active substance in an electrode plate in a lead accumulator. The present invention provides a granular material lead powder that fulfills the requirements of resistance, size and quality, and which, when being used as an active substance in the lead accumulator, does not deteriorate in its capacity or lifetime. The qualities are achieved by means of the microporous, substantially hollow granules containing 0.5-2.0% by weight of a binder, with a particle diameter of 40-500 m and with the bulk density of 2.4-3.4 g/cm$^3$.

9 Claims, No Drawings

GRANULAR MATERIAL CONSISTING OF MICROPOROUS HOLLOW GRANULES OF LEAD POWDER

The present invention relates to a granular material consisting of microporous, substantially hollow granules of lead powder, which is a powdered mixture of lead and lead oxides, a method for the production of this granular material as well as the use thereof as an active substance in an electrode plate in a lead accumulator.

The lead accumulator despite its great weight and rather considerable self-discharge is still the type of accumulator of greatest importance and it is reasonable to presume it will stay this way even in a force-seeable future. Thus, it is essential to try to improve its construction and its capacity. Depending on the range of use a distinction is made between storage batteries, tractionary batteries and stationary batteries.

In a conventional lead accumulator the electrode plates are formed as lead grids, the spaces of which through lubrication have been filled with lead powder. During the first charge, the formation, the PbO and Pb in the lead powder are oxidized to $PbO_2$ in the positive plate and PbO is reduced to Pb in the negative plate, whereafter the cell is ready to be used.

The electrode plate can also be of a tubular type, which is the case especially in tractionary and stationary batteries whereby a considerably improved life time is achieved. A tubular electrode plate consists of a conducting grid frame of lead connected to a number of parallel central conductors, which each is surrounded by an inert, perforated tube casing, being sealed at the bottom. Between the casing and the central conductors the active material is placed, which normally consists of a pulverous lead powder. The production of these tubular electrodes is involved with certain difficulties as the active material is very fine-grained. In order to achieve an acceptable filling with a dry powder the tubes must be vigorously shaken and special vibration devices must be used. Furthermore, this dry filling is directly unsuitable from an environmental point of view as the powder easily raises dust and due to its toxicity, thus, requires the personel to use protective clothing and breathing protections.

To avoid these problems the s.c. wet filling method has been introduced by which the lead powder is mixed with sulphuric acid and water to a homogenous paste which is pressed into the tubes. However, this method renders varying results and throughout a decrease of the capacity. Another disadvantage is high installation costs and a "sticky" work requiring an intensive supervision.

Through the production of granules of the lead powder the tubular electrodes can be filled by pouring without raiseing dust and without vibration. The obtained electrode filling also becomes very homogenous, i.e. the structural differences in the packed material which easily result from filling with powder are avoided. Furthermore, a much too dense packing making the electrolyte flow difficult is avoided. Thus, for a long time, one has tried to obtain granules of lead powder which could be used as an active material in electrode plates.

Different additives have been tested for the production of granules with a sufficient strength. SE PS No. 224,815, for example, discloses a method to produce particles of active material with the desired filling qualities wherein the material is wetted with a mixture of a sparingly volatile and a volatile substance and is thereafter pressed through a sieve. DE AS No. 1,013,273 also discloses a method to produce granules which method consists of adding 5-15% additive to the active material while stirring, heating the active material to 300° C. and sieving.

In order to avoid deposits in the accumulator cell which decreases its life time one has also tried to produce granules without the addition of a binder of any kind. DE OS No. 1,817,966 discloses a method for the production of a PbO granulate free from binders according to which the active material is mixed with water and granulated in a known way in a granulator and dried. It is also known to mix the active material with sulphuric acid and water and thereafter produce granules by pressing the mass through a sieve.

The granules produces by previously known methods, however, have proven to be worthless for industrial use in lead accumulators, either due to a deficient resistance which makes handling and storage impossible or due to the fact that they leave deposits in the electrolyte and on the electrode plates which decreases the performance and life time of the accumulator.

The object with the present invention is to achieve a granular material of lead powder fulfilling the requirements for resistance, size and quality, and which, when being used as an active substance in a lead accumulator, does not deteriorate its capacity and life time. This is achieved by means of microporous, substantially hollow granules containing 0.5-2.0% by weight of a binder, with a particle diameter of 40-500 μm and with a bulk density of 2.4-3.4 $g/cm^3$.

The granules according to the invention are easy to handle and do not raise dust. They are mostly hollow and have a microporous structure making acid diffusion and convection possible and a bulk density which can easily be adjusted to an optimum value within the stated interval 2.4-3.4 $g/cm^3$. Furthermore, and quite surprisingly, they show a life time which considerably exceeds the life time of earlier known porous granules when used as an active material in electrodes. The highly porous electrodes earlierly produced have initially contained a substance being soluble in sulphuric acid, which substance by the formation, when the basic material is transferred to the electrochemically active lead dioxide, is being released which results in a hollow space. The hereby formed electrode skeleton has had a tendency to disintegrate after some hundred cycles of charging and discharging. The granules according to the invention, however, are extremely strong and have proved to have a life time of more than 1500 cycles. This life time is of the same order as for conventional batteries.

Another advantage with a granular material according to the invention in comparison with a standard lead powder it is its capability of a greater internal expansion, which in turn contributes to a longer life time of the tube casings of tubular electrodes. Pb and $PbO_2$ in the surface layer on the granules form in the presence of sulphuric acid while discharging the cell more voluminous $PbSO_4$.

The lead powder forming the basic material for the production of the granules is a pulverous, homogenous mixture of lead oxide (PbO), metallic lead (Pb) and optionally red lead oxide ($Pb_3O_4$).

The binder in the granules according to the invention must not influence the cell function or the corrosion of metallic lead in the used amount of 0.5-2.0% by weight.

Neither must the binder be too soluble in sulphuric acid. As an example of possible binders we can mention water glass, different plastic emulsions and polysacharides. A preferred binder according to the invention is polyvinyl alcohol, preferably a water soluble one. One should, of course, strive to keep the binder content as low as possible and a preferred range is 0.8–1.5% by weight.

The granular material may well comprise granules of two different size fractions, partly with a particle diameter of 40–60 μm and partly with a particle diameter of 110–150 μm. Hereby a better filling degree is achieved than with a uniform size of particles, as well as an increased porosity and pore distribution, which favours the electrolyte flow.

The granular material according to the invention is produced by suspending lead powder in water and addition of a binder whereafter the lead powder is transferred into granules. The method is characterized by the binder being added in an amount of 0.5–2.0% by weight of calculated on the dry substance, the suspension being heated to 100°–150° C. and thereafter spray-dried into granules with a diameter of 40–500 μm by pressing through a nozzle under pressure into a drying chamber of an elevated temperature.

The granulation of the suspension of lead powder and binder in water can be performed in a conventional spray drying apparatus with a container for the suspension from where the starting material under pressure and via an atomizer is pumped into a drying chamber, into the upper part of which drying air is led, preferably heated to a temperature of 260°–320° C. The product is removed from the lower part of the drying chamber which also is provided with an outlet for the now moist drying air which, there, has a considerably lower temperature, 130°–150° C. By varying pressure, temperature and binder content the size of the granules can be controlled in a desirable way.

The granular material according to the invention can be used as an active substance in accumulator batteries, preferably in the positive electrode plate, which thereby has proven to obtain an improved capacity, but also in the negative plate. The granules can be used instead of lead powder in different types of lead batteries, but are particularly suitable for application in tubular electrodes, the production of which thereby is considerably simplified.

A preferred shape of a tubular electrode, which results in a lead battery with a considerably elevated performance, a.o. an energy density of 40–45 Wh/kg cell, has, apart from granulated lead powder as an active material, a special geometry which favours the electrolyte flow. The tube casings surrounding the central conductors which are connected to the grid frame are formed with an elliptical cross section and are diagonal in relation to the grid frame in an angle of 25°–50°, and contact each other merely along one line.

The invention will be further illustrated by means of the following examples on the production of granulated lead powder.

EXAMPLE I 100 kg fine-powdered lead powder consisting of 30% $Pb_3O_4$ and 70% of a mixture of 70% PbO and 30% Pb was suspended in water to a dry content of 75%. Thereto was added, as a binder 1.5 kg Moviol ® 4-88, a polyvinyl alcohol with a hydrolysis grade of 88% and a viscosity of 4 cP for a water solution of 4%. The suspension was transferred to a closed pressure chamber, wherein it was heated and circulated. When the temperature of the suspension was about 125° C. the spray drying was initiated. Hereto a spray drying chamber with a diameter of 2.2 m, a cylindrical height of 1.95 m and a conical bottom part with an outlet for the final product was used. Drying air, heated directly with propane gas to a temperature of 290° C., was led into the upper part of the chamber and the moist air, the temperature of which had fallen to 140° C., was led out of the chamber through an outlet at its lower part. The suspension in the heated chamber was pumped to an upward directed nozzle placed 2.75 m below the ceiling of the chamber and was sprayed under a nozzle pressure of 1.5 MPa. By the expansion in the chamber free falling almost globular granules of lead-lead oxide of essentially two different size fractions with an average diameter of 50 μm (60%) and 130 μm (40%), respectively, were formed. These granules were porous and had a bulk density of 3.2 $g/cm^3$.

EXAMPLE II

In accordance with Example I and by using the device described therein, 50 kg lead powder were suspended with 12.5 kg water and 1.5 kg sodium silicate of 30%. This suspension was dried at a chamber temperature of 260° C./150° C. and a nozzle pressure of 0.8 MPa and gave free flowing granules with a bulk density of 2.40 $g/cm^3$ and with a somewhat larger particle diameter than in the preceding example. A sieve analysis shows that 83% of the granules have a diameter larger than 120 μm and 42% a diameter larger than 177 μm.

Granules produced in accordance with Example I without a binder by heating lead powder in water and sulphuric acid and by conversion of the suspension in an analogue way, were hard to dry were not free flowing and had a poor mechanical resistance.

To determine the capacity and the overpotential, four cells were tested, of which three were test cells with granular material produced in accordance with Example I and one was a reference cell with conventional lead powder. Each cell comprised two dry charged plates of porous lead of the dimension 24×140×1.7 mm as negative electrodes and as a positive electrode elliptical tubes filled with an active material in an amount of 17.8 g, 18.3 g, 17.9 g (the test cells) and 18.2 g (the reference cell), respectively. As an electrolyte 130 ml $H_2SO_4$ with the density of 1.28 $g/cm^3$ was used, i.e. surplus acid.

The cells were formed at 50 mA for four days, thereafter at 300 mA until at least 300% of the necessary amount of electricity had been introduced. The potential progress was registered on a recorder with a reference electrode of a cadmiumtype "Tudor RCD". No measurable difference in the potential between reference cell and test cells could be noted during the formation.

The discharge was performed with about 1 h current (=0.6A) and with ¼ h current (=1.0A), which means that the cells were heavily loaded. Furthermore, the cells were completely discharged from time to time, i.e. the positive electrode was kept for some time on a lower potential than the negative electrode. Despite this fact the cells all the time showed good capacity qualities after a renewed charging.

The capacity of the cells appears from the following table illustrating the time of discharge in nine 0.6A discharges.

TABLE

| 0.6A discharge No. | Discharge lapse, min | |
|---|---|---|
| | Reference cell | Test cells 1–3 |
| 1 | 53 | 52–56 |
| 2 | 51 | 53–56.5 |
| 3 | 43 | 48.5–50.5 |
| 4 | 52.5 | 58–60 |
| 5 | 52 | 59.5–62.5 |
| 6 | 42.5 | 49.5–52 |
| 7 | 49 | 58–61 |
| 8 | 33 | 42–44.5 |
| 9 | 50.5 | 59–63.5 |

The lower values for the discharges 3, 6 and 8 are due to the previous complete discharge as well as three 1.0A discharges before 3, complete discharge and two 1.A discharges before 6, and complete discharge before 8. Charges and discharges were made with a constant current and all the cells were put to work following exactly the same pattern.

The table clearly shows that the granule cells after the second discharge already have higher capacity values than the reference cell. Particularly high values are achieved for the granule cells after the complete discharges (3, 6, 8) which is a good indication of the resistance of the test cells. Various self-discharges during shorter and longer periods of time showed that the test cells did not have a higher self-discharge than cells without polyvinyl alcohol. Furthermore, after about 100 cycles, the test cells still showed a higher capacity than the reference cell.

Measurements of the hydrogen overpotential of the negative electrodes showed that the hydrogen overpotential of the reference cell was somewhat higher than the one of the test cells. This means that, when charging, hydrogen gas starts developping somewhat earlier in cells with polyvinyl alcohol in the electrolyte. The examined test cells, however, showed a good charging susceptibility and the zero passage when charging occurred at the same time as for the reference cell. In cells with polyvinyl alcohol the surface absorption of hydrogen gas was also surprisingly reduced, probably due to the fact that the negative electrode becomes covered with a thin film of polyvinyl alcohol. This results in the disappearance of the hydrogen gas and the potential will quickly rise to the balance position.

Life time tests were performed with tubular electrode plates of the size of a storage battery filled with granules produced in accordance with Example I. After 2 h discharging to 1.60 V and subsequent 5 h charging a life time of about 800 cycles was achieved. The capacity had then fallen to 85% of the original value. This means that tubular electrodes filled with granules according to the invention have the same life time as tubular electrodes filled with a pulverous lead powder.

The carried out experiments show that tubular electrodes with granules according to the invention render at least 10% and up to 30% higher capacity than tubular electrodes filled with the same amount of ordinary lead powder at a relatively high load. This is quite an important improvement, especially considering that the polyvinyl alcohol which has been released from the granules contrary to expectation merely has a very insignificant influence on the chargability and life time of the cell, which stay of the same order as for conventional powder cells.

I claim:

1. Method for production of a granular material consisting of microporous, substantial hollow granules of lead powder wherein the lead powder is suspended in water and a binder is added whereupon said suspension is transferred into granules, characterized in that the binder is added in an amount of 0.5–2.0% by weight calculated on the dry substance, the suspension is heated to 100°–150° C. and thereafter spray-dried to granules present in substantially two fractions with a particle diameter of 40–60 $\mu$m and 110–150 $\mu$m, respectively, by forcing through a nozzle under pressure into a drying chamber of an elevated temperature.

2. Method according to claim 1, characterized in that the binder is a polyvinyl alcohol and the temperature of the drying air in the drying chamber varies from an inlet temperature of 260°–320° C. to an outlet temperature of 130°–150° C.

3. Method according to claim 2, characterized in that the suspension is heated to 125° C., is forced through a nozzle under an overpressure of 1.5 MPa into a drying chamber wherein a drying air of a temperature of 290° C. is led.

4. The use of granules of lead powder according to claim 1, as the active substance in electrode plate in a lead accumulator.

5. Use according to claim 4, characterized in that the electrode plate is a tubular electrode plate with a grid frame of lead connected to parallel central conductors, which each is surrounded by an inert, perforated tube casing, sealed at the bottom.

6. Granular material for use as an active substance in an electrode plate of a lead accumulator, comprising: a lead powder mixture of microporous, substantially hollow granules of lead and lead oxides, prepared by suspending lead powder in water and adding polyvinyl alcohol as a binder in an amount of 0.5–2.0% by weight, heating the suspension to 100°–150° C. and spray-drying the heated suspension by forcing it through a nozzle under pressure into a drying chamber of an elevated temperature, the granules being present in the powder in substantially two particle size fractions having a particle diameter within the range of 40–500 $\mu$m and a bulk density of 2.4–3.4 g/cm$^3$.

7. Granular material of claim 6, being prepared from a suspension comprising 0.8–1.5% by weight polyvinyl alcohol.

8. Granular material of claim 6 or 7, wherein the granules are present in the powder in substantially two fractions, the first fraction having a particle diameter of 40–60 $\mu$m and the second fraction having a particle diameter of 110–150 $\mu$m.

9. Use according to claim 4 or 5, characterized in that the electrode plate is shaped with elliptical tube casings being diagonal in an angle of 25°–50° in relation to the grid frame and are in contact with each other merely along one line.

* * * * *